United States Patent
Kobayashi

(10) Patent No.: US 6,677,994 B1
(45) Date of Patent: Jan. 13, 2004

(54) IMAGE PROCESSING APPARATUS METHOD OF THE SAME AND CAMERA APPARATUS

(75) Inventor: Atsushi Kobayashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/104,432

(22) Filed: Jun. 25, 1998

(30) Foreign Application Priority Data

Jun. 26, 1997 (JP) ............................................ P9-170567

(51) Int. Cl.[7] .......................... H04N 5/208; H04N 5/21; G06K 9/40
(52) U.S. Cl. ...................... 348/252; 348/625; 348/627; 382/266
(58) Field of Search ................................ 348/252, 625, 348/627, 71, 65; 382/266, 263

(56) References Cited

U.S. PATENT DOCUMENTS

| | | | | |
|---|---|---|---|---|
| 4,918,528 A | * | 4/1990 | Oohashi | 348/625 |
| 5,457,546 A | * | 10/1995 | Hong | 348/625 |
| 5,469,225 A | * | 11/1995 | Hong | 348/625 |
| 5,550,936 A | * | 8/1996 | Someya et al. | 348/625 |
| 5,572,603 A | * | 11/1996 | Koike | 382/199 |
| 5,696,850 A | * | 12/1997 | Parulski et al. | 382/261 |
| 5,699,126 A | * | 12/1997 | Hong | 348/625 |
| 5,847,774 A | * | 12/1998 | Cho | 348/625 |
| 5,883,666 A | * | 3/1999 | Kyuma et al. | 348/229 |
| 5,898,464 A | * | 4/1999 | Cho | 348/625 |
| 5,936,682 A | * | 8/1999 | Thomas et al. | 348/625 |
| 2003/0156223 A1 | * | 8/2003 | Min | 348/625 |

FOREIGN PATENT DOCUMENTS

JP        06217114 A  *  8/1994  ............ H04N/1/40

* cited by examiner

Primary Examiner—Wendy R. Garber
Assistant Examiner—John M. Villecco
(74) Attorney, Agent, or Firm—Rader, Fishman & Grauer PLLC; Ronald P. Kananen

(57) ABSTRACT

An image processing apparatus having a compensation value calculating unit, wherein an XOR element compares the signs of a difference A with a difference r and output the difference A as a compensation value when the signs are the same, while decides that an edge portion of an image data is detected when the signs are different and wherein a comparator compares the absolute value of the difference A with a value obtained by multiplying a constant a with the absolute value of the difference r in a multiplier and adding a constant b in a second adder. When the result of the comparison is that the former is less than the latter, the input predetermined difference A is output as a compensation value. When the former is larger than the latter, the value obtained by multiplying the complement of 2 of the difference r calculated in the complement calculating unit with a constant c in the first multiplier and further adding a constant d in the first adder is selected by a switching unit, and the selected value is output as a standard compensation value.

24 Claims, 5 Drawing Sheets

IMAGE PROCESSING APPARATUS METHOD OF THE SAME AND CAMERA APPARATUS

BACKGROUND OF THE INVENTION

1. Field of the Invention

The present invention relates to an image processing apparatus and an image processing method which can carry out suitable contour compensation on input image data and which may be applied to a video camera, digital still camera, or other apparatus and relates to a camera apparatus capable of carrying out suitable contour compensation and taking a high quality image.

2. Description of the Related Art

The recent rapid improvements in the performance of charge coupled devices (CCD) have led to the spread of video cameras, digital still cameras, scanners, and other apparatuses utilizing such solid state imaging elements for inputting images.

The image signal obtained by a CCD or other solid state imaging element deteriorates in high frequency response due to the properties of the optical parts before entering the solid state imaging elements. The high frequency components therein are cut in order to avoid generating a false signal.

Accordingly, if the signal directly output from the solid state imaging element itself is used, the resultant image becomes blurred due to the low proportion of the high frequency components.

To avoid this, normally processing called "contour compensation" is carried out. Contour compensation is generally performed by extracting just the high frequency component from the image signal, appropriately amplifying it to generate a contour compensation signal, and adding the contour compensation signal to the original image signal.

The above method for generating a contour compensation signal of the related art, however, is based on use of a linear filter, so there was the disadvantage that an overshoot or undershoot occurs near an edge where the brightness changes is steps and therefore the image becomes too bright or too dark near the edge. Therefore, there was the disadvantage that the contours are enhanced, but the image tends to become unnatural.

To solve the disadvantage, it can be considered to introduce a circuit which performs edge detection and other processing so as prevent excessive compensation at the edge portions of the image. Such a circuit, however, becomes complicated and large. Therefore, the overall apparatus becomes large and costly.

SUMMARY OF THE INVENTION

An object of the present invention is to provide an image processing apparatus which can avoid excessive compensation and suitably compensate a contour without making the apparatus larger.

Another object of the present invention is to provide an image processing method capable of preventing excessive compensation and carrying out suitable contour compensation.

Still another object of the present invention is to provide a video camera, still camera, or other camera apparatus which can prevent excessive compensation, carry out suitable contour compensation, and take a high quality image without increasing the size of the device.

According to a first aspect of the present invention, there is provided an image processing apparatus, comprising a first image processing means for carrying out desired image processing on input image data, a pixel detecting means for detecting a change in the relationship of magnitude of values between a pixel before and after image processing based on the values of pixels of the processed image data and the input original image data, and a selecting means for selecting a pixel where there is no change in the relationship of magnitude between the two sets of image data based on the results of the detection as a pixel which has been suitably processed.

Preferably, the image processing is image enhancement processing.

More preferably, the first image processing means comprises a compensation value detecting means for detecting a compensation value for carrying out the image enhancement processing on each pixel of the input ,original image data and a pixel generating means for adding the detected compensation value to the value of the corresponding pixel of the input original image to generate compensated pixel data to generate enhanced image data.

More preferably, the selecting means outputs the compensation value of the selected pixel.

Preferably, the selecting means outputs the compensated pixel data for a selected pixel and the pixel data of the input original image data for a not selected pixel as image data of the result of the image enhancing processing.

Preferably, the apparatus further includes a second image processing means for carrying out second image enhancing processing with less effect than the first image enhancing processing on the input image data and the selecting means outputs the compensated pixel data of the first image processing means for a selected pixel and the compensated pixel data of the second image processing means for a not selected pixel as image data of the result of the image enhancing processing.

Preferably, the pixel detecting means performs primary differentiation on each pixel value of both the enhanced image data and the original image data and detects a change of the sign of the differentiated values to detect a change in the relationship of the two pixel values and the selecting means selects a pixel where there is no change in sign of the differentiated value as a suitably enhanced pixel.

Alternatively, the pixel detecting means carries out subtraction for each pixel value of both the enhanced image data and the original image data from each adjacent pixel of the pixel and detects a change of the sign of the value of the remainder to detect a change in the relationship of the pixel values and the selecting means selects a pixel where there is no change in sign of the remainder as a suitably enhanced pixel.

Preferably, the image enhancing processing is processing to enhance the contour of an image.

According to a second aspect of the invention, there is provided an image processing method including the steps of carrying out desired image processing on input image data, comparing values of the processed image data and the input original image data for each pixel, detecting a change in the relationship of magnitude of values between pixels, and selecting a pixel where there is no change in the relationship of magnitude between the two sets of image data based on the results of the detection as a pixel which has been suitably processed.

Preferably, the image processing is image enhancement processing.

Preferably, the image processing step comprises detecting a compensation value for carrying out the image enhancement processing on each pixel of said input original image data and adding the detected compensation value to the value of the corresponding pixel of the input original image to generate compensated pixel data to generate enhanced image data.

Preferably, the method outputs the compensated pixel data for a selected pixel and the pixel data of said input original image data for a not selected pixel as image data of the result of the image enhancing processing.

Preferably, the method further comprises carrying out second image enhancing processing with less effect than the first image enhancing processing on the input image data and outputting the compensated pixel data of the first image processing for a selected pixel and the compensated pixel data of the second image processing for a not selected pixel as image data of the result of the image enhancing processing.

Preferably, the step of detecting a change in the pixel performs primary differentiation on each pixel value of both the enhanced image data and the original image data and detects a change of the sign of the differentiated values to detect a change in the relationship of the two pixel values and the selecting step selects a pixel where there is no change in sign of the differentiated value as a suitably enhanced pixel.

Alternatively, the step of detecting a change in the pixel carries out subtraction for each pixel value of both the enhanced image data and the original image data from each adjacent pixel of the pixel and detects a change of the sign of the value of the remainder to detect a change in the relationship of the pixel values and the selecting step selects a pixel where there is no change in sign of the remainder as a suitably enhanced pixel.

Preferably, the image enhancing processing is processing to enhance the contour of an image.

According to a third aspect of the present invention, there is provided a camera apparatus comprising an image input means for taking a desired image and inputting the image data, an image processing means for carrying out image enhancing processing on the input image data comprising a first image processing means for carrying out the image enhancing processing on the input image data, a pixel detecting means for comparing pixel values of the enhanced image data and the input original image data for each pixel and detecting a change of the relationship of magnitude of the pixel value between pixels, and a selecting means for selecting a pixel where there is no change in the relationship of magnitude as a suitably processed pixel based on the result of the detection, a coding means for coding the processed image data, and a recording means for recording the coded image data.

Preferably, the selecting means of the image processing means outputs the compensated pixel data for a selected pixel and the pixel data of the input original image data for a not selected pixel as image data of the image enhancing processing.

Preferably, the image processing means further comprises a second image processing means for carrying out second image enhancing processing with less effect than the first image enhancing processing on the input image data and the selecting means outputs the compensated pixel data of the first image processing means for a selected pixel and the compensated pixel data of the second image processing means for a not selected pixel as image data of the result of the image enhancing processing.

Preferably, the image enhancing processing is processing to enhance the contour of the image.

Preferably, the image input means is a device to take a still picture and the recording means records the image data in a memory card.

Alternatively, the image input means is a device to take a moving picture and the recording means records the image data on video tape.

BRIEF DESCRIPTION OF THE DRAWINGS

These and other objects and features of the present invention will become clearer from the following description of the preferred embodiments given with reference to the accompanying drawings, in which:

FIG. 4 is an explanatory view of pixels relating to the processing in the compensation value calculating apparatus shown in FIG. 3.

DESCRIPTION OF THE PREFERRED EMBODIMENTS

Below, preferred embodiments will be described with reference to the accompanying drawings.

As a first embodiment of the present invention, an explanation will be made of an electronic digital still camera referring to FIGS. 1 and 2.

Figure 1:
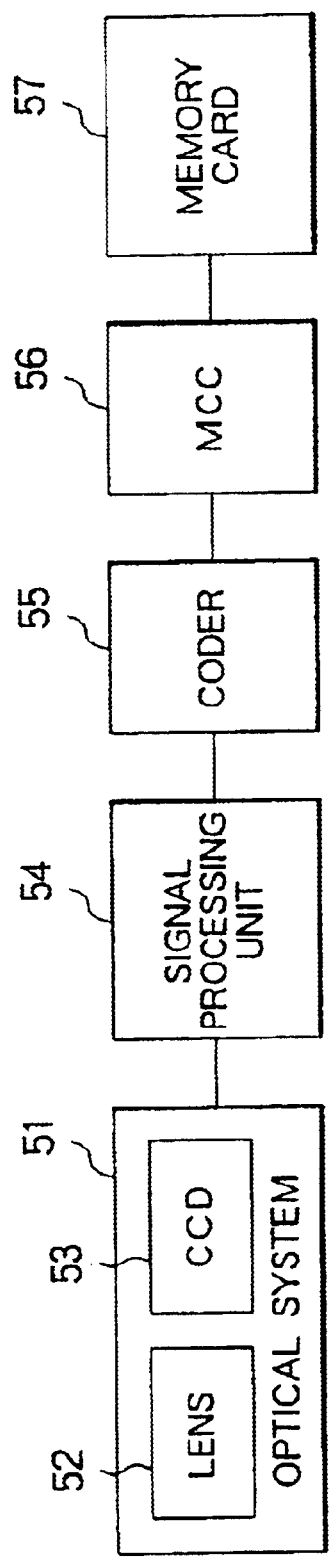
FIG. 1 is a block diagram of the configuration of a digital still camera according to a first embodiment of the present invention.

FIG. 1 is a block diagram of the configuration of the digital still camera.

A digital still camera 50 comprises an optical system 51, a signal processing unit 54, a coder 55, a memory card controller (MCC) 56, and a memory card 57.

The optical system 51 has a lens mechanism (LENS) 52 and a CCD 53.

The lens mechanism 52 comprises lenses for actually capturing the light from the object, a low-pass filter for eliminating color moire, a filter for blocking infrared light, etc. The mechanism suitably focuses the image from the object on the CCD 53.

The CCD 53 converts the image focused by the lens mechanism 52 to an electric signal which it outputs to the signal processing unit 54. There are a variety of forms of the CCD 53. A device which functions in the same way as a camcorder CCD may be used, however, the present embodiment uses an element for a digital still camera where the pixels are arranged in a square lattice and the data of the pixels is output by the full pixel reading method.

The signal processing unit 54 converts the original image signal input from the CCD 53 to a codable signal suitable as an image signal. Specifically, the signal processing unit 54 carries out correlation dual sampling (CDS) processing for reducing the low frequency noise etc., analog/digital (A/D)

conversion processing for converting analog signals to digital signals, processing for breaking down the pixel signal into color signals etc. to generate a luminance signal, chroma signal, or other desired image signal, etc. The contour compensation apparatus of the present invention is provided in this signal processing apparatus 54 where the contour compensation processing is performed.

The coder 55 performs discrete cosign transform (DCT), quantization, Huffman coding, etc. on the image signal obtained from the signal processing unit 54 to generate a coded image signal of, for example, the JPEG system (coding system to compress the still picture band by the Joint Photographic Image Coding Experts Group).

The memory card controller 56 controls the memory card 57 to record the coded image signal generated in the coder 55 in the memory card 57.

The memory card 57 is a removable recording medium which uses a semiconductor memory as the recording medium. It is controlled by the memory card controller 56 and records the coded image signal generated in the coder 55.

Next, an explanation will be made with reference to FIG. 2 of a contour compensation apparatus which is provided in the signal processing portion 54 of such a digital still camera 50 and carries out contour compensation processing on the image obtained by the CCD 53.

Figure 2:
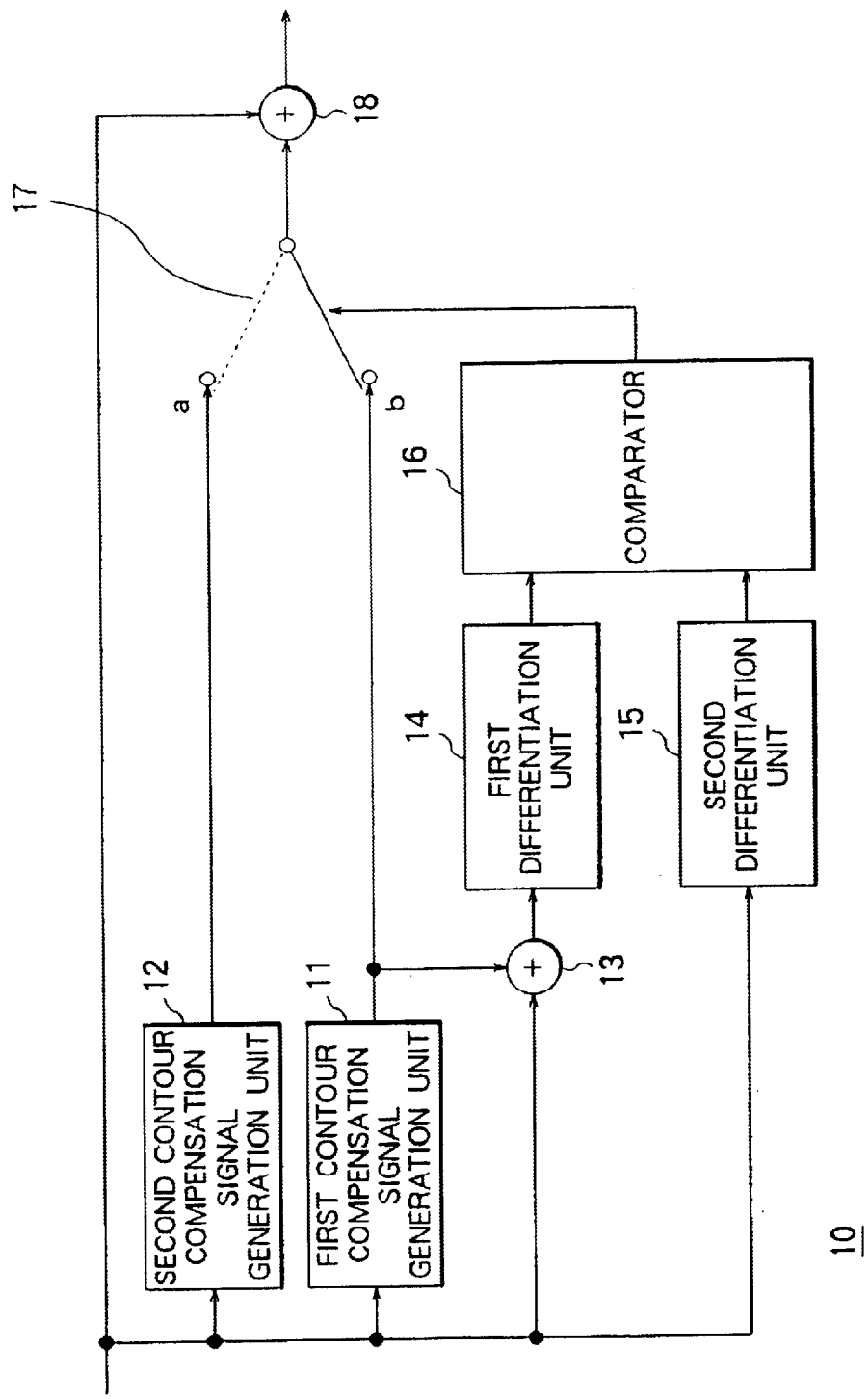
FIG. 2 is a block diagram of the configuration of a contour compensation apparatus in a signal processing unit of a digital still camera according to the first embodiment of the present invention.

FIG. 2 is a block diagram of the configuration of the contour compensation apparatus 10.

The contour compensation apparatus 10 comprises a first contour compensation signal generation unit 11, second contour compensation signal generating unit 12, adder 13, first differentiation unit 14, second differentiation unit 15, comparator 16, compensation value selecting switch 17, and adder 18.

Note that the contour compensation apparatus 10 is provided with a not illustrated control unit. The above components operate in response to control signals from the control unit and cooperate to carry out the desired processing.

The contour compensation apparatus 10 performs processing, described below, on the pixel data successively input from the CCD or other camera apparatus while referring to the data of the pixels surrounding each pixel. Accordingly, there is also provided a not illustrated buffer in the contour compensation apparatus 10 for suitably performing such processing. The successively input pixel data is temporarily stored in the buffer, suitably referred to, and provided for the desired processing.

First, the configuration of each part of the contour compensation apparatus will be explained.

The first contour compensation signal generation unit 11 calculates a compensation value to be applied to each pixel for performing image enhancing processing and outputs the value to a terminal b of a compensation value selecting switch 17. Specifically, the first contour compensation signal generation unit 11 calculates a compensation value for linearly amplifying the pixel value based on the values of the adjacent pixels.

The second contour compensation signal generation unit 12, in the same way as the first contour compensation signal generation unit 11, calculates a compensation value to be applied to each pixel for image enhancing processing and outputs the value to a terminal a of the compensation value selecting switch 17. The second contour compensation signal generating unit 12, however, calculates a compensation value where the relationship of magnitude of the values between pixels does not change as a result of successively performing compensation on the pixels for which the compensation value is being calculated and the adjacent pixels. Specifically, the second contour compensation signal generation unit 12 calculates and outputs a relatively small compensation value of an extent not able to cause a change of the relationship of magnitude of the pixel values based on the difference in the value with the adjacent pixels.

The adder 13 adds the compensation value calculated in the first contour compensation signal generation unit 11 to the original pixel value for performing the compensation.

The first differentiation unit 14 performs primary differentiation on the successively input pixel values compensated in the adder 13 and outputs the differentiated values to the comparator 16.

The second differentiation unit 15 performs primary differentiation on the pixel values input to the contour compensation device 10 and outputs the differentiated values to the comparator 16.

The comparator 16 compares the sign of the differentiated value obtained in the first differentiation unit 14 with the sign of the corresponding original value obtained in the second differentiation unit 15. It then outputs a switching signal to the compensation valued selecting switch 17 based on the result. Specifically, when the signs of the two differentiated values from the first and second differentiation units are different, the comparator 16 outputs a signal to select terminal a to the compensation value selecting switch 17 and outputs a signal to select terminal b when the signs are the same.

The compensation value selecting switch 17 selects one of the compensation values calculated and output from the first and second contour compensation signal generating units 11 or 12 in response to the selecting signal input from the comparator 16 and outputs the selected value to the adder 18.

The adder 18 adds the input compensation value selected by the compensation value selecting switch 17 to the original pixel value to perform the compensation.

Next, an explanation will be made of the operation of the contour compensation apparatus 10.

The pixel data of the image obtained by the CCD or other camera apparatus is successively input to the contour compensation apparatus 10. The first and second contour compensation signal generation units 11 and 12 generate contour compensation signals. As mentioned above, the compensation signal generated in the first contour compensation signal generation unit 11 is a compensation signal which is ordinarily used and can produce clear image enhancement to a certain extent. The compensation signal generated in the second contour compensation signal generation unit 12 is a compensation signal decided on giving greatest priority to avoiding a change in the relationship of magnitude of the values with adjoining pixels resulting from compensation. Accordingly, it is sometimes a compensation signal which only enables a slight effect but better than no compensation being performed at all.

The compensation signals generated in the first contour compensation signal generation unit 11 is immediately added to the original pixel data in the adder 13 and used for compensation. The compensated pixel data is differentiated at the first differentiation unit 14, and the sign of the differentiated value is output to the comparator 16.

On the other hand, the input pixel data is successively differentiated at the second differentiation device 15, and the sign of the differentiated value is output to the comparator 16.

The comparator 16 compares the sign of the pixel data obtained in the first differentiation unit 14 with the sign of the original pixel data obtained in the second differentiation device 15. When they are same, it decides that suitable compensation can be carried out by using the compensation signal generated in the first contour compensation signal generation unit 11 and the compensation value selecting switch 17 selects the terminal b. When the signs are different, it decides that the compensation would be excessive if using the compensation signal generated in the first contour compensation signal generation unit 11, and the compensation value selecting switch 17 selects the terminal a. As a result, it selects the compensation value generated in the second contour compensation signal generation unit 12.

Then, the adder 18 adds the selected compensation value to the original pixel signal for the image enhancement processing.

As explained above, the contour compensation apparatus 10 of the present embodiment decides on the compensation signal so that there is no change in sign even with primary differentiation of the image signals before and after the image enhancement processing. In other words, the compensation signal is limited to such a range.

Accordingly, an overshoot or undershoot can be prevented at the edge portion of an image where the brightness changes in steps and therefore excellent compensation can be performed. Also, since burst-like signals where white and black are continuously repeated do not change in sign after primary differentiation even when a high frequency component is added, processing for adding the high frequency component can be performed in the same way as in the past.

Further, the contour compensation apparatus 10 can perform suitable image enhancement processing by just performing processing for all the pixel data, therefore there is no need for performing edge detection in advance. As a result, the apparatus can be simplified.

As a result, the digital still camera 50 can take high quality pictures.

Second Embodiment

The image processing apparatus of the second embodiment of the present invention will be explained next referring to FIGS. 3 to 5.

The above contour compensation apparatus 10 in the digital still camera 50 according to the first embodiment of the present invention required two differentiation units, a comparator, and other circuits for comparing the signs of the primary differentiated values of the pixel data before and after addition of the compensation value. However, these circuits were somewhat complicated, therefore there was a demand for constructing a similar contour compensation apparatus using simpler circuits. Accordingly, a case using simpler basic components while performing substantially the same processing will be explained as a second embodiment.

The contour compensation apparatus of the second embodiment is provided in a signal processing apparatus 54 of a digital still camera 50 of the same configuration as the first embodiment and performs contour compensation processing on an image taken by a CCD 53.

Note that the components other than the contour compensation apparatus are the same as those of the first embodiment and explanations thereof are omitted.

Figure 3:
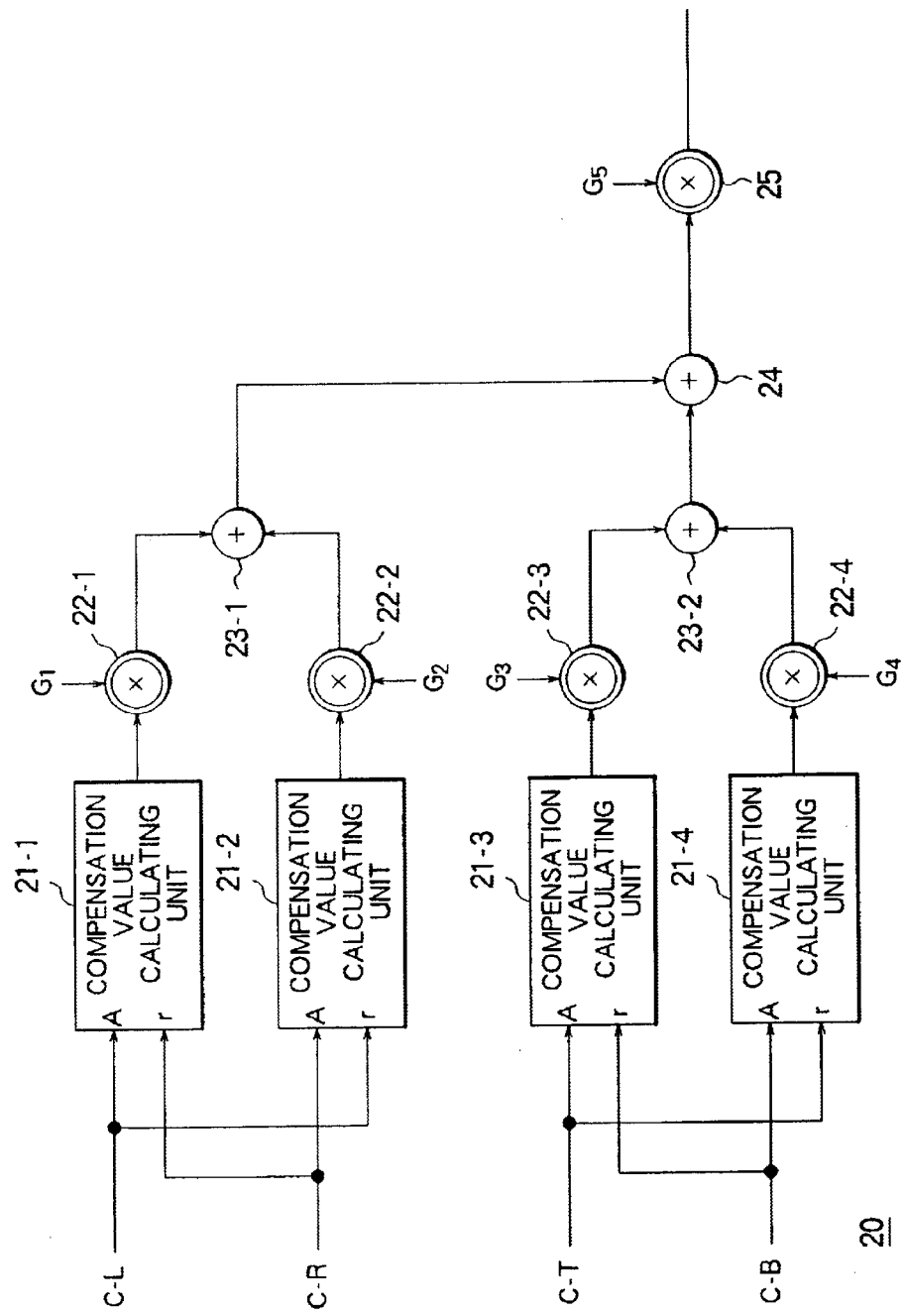
FIG. 3 is a block diagram of the configuration of a compensation value calculating apparatus of an image processing apparatus according to a second embodiment of the present invention.

FIG. 3 is a block diagram of the configuration of a compensation value calculating apparatus 20 of the second embodiment.

The compensation value calculation apparatus 20 comprises first to fourth compensation value calculating units $21_{-1}$ to $21_{-4}$, five multipliers $22_{-1}$ to $22_{-4}$ and 25, and three adders $23_{-1}$, $23_{-2}$, and 24.

Figure 4:
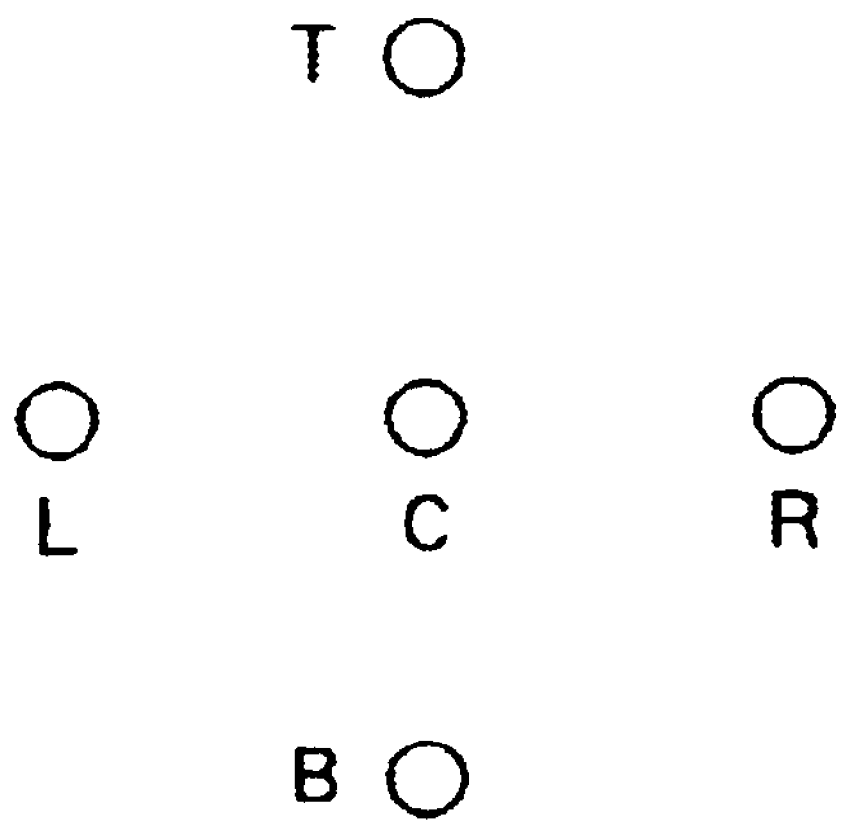

The compensation value calculating apparatus 20 of the second embodiment, as shown in FIG. 4, calculates the compensation value for a pixel C by referring to values of its left pixel L, right pixel R, top pixel T, and bottom pixel B. Specifically, as shown in FIG. 3, the differences C–L, C–R, C–T, and C–B of the pixel C with each of surrounding pixels (values of pixels are referred to as C, L, R, T, and B) are input to the compensation value calculating apparatus 20, then the compensation value for the pixel C is calculated based on the differences.

First, an explanation will be made of the configuration of each portion of the contour compensation calculating apparatus 20.

The first to fourth compensation value calculating units $21_{-1}$ to $21_{-4}$ have input in them the differences C–L, C–R, C–T, and C–B of the pixel for which the compensation value is being calculated and the differences C–R, C–L, C–B, and C–T of the pixel for reference when calculating the compensation value. Then, it calculates the reference compensation values standard based on the differences of the pixel values.

The compensation value calculation unit $21_{-i}$ (i=1 to 4) will be explained next in more detail with reference to FIG. 5.

Figure 5:
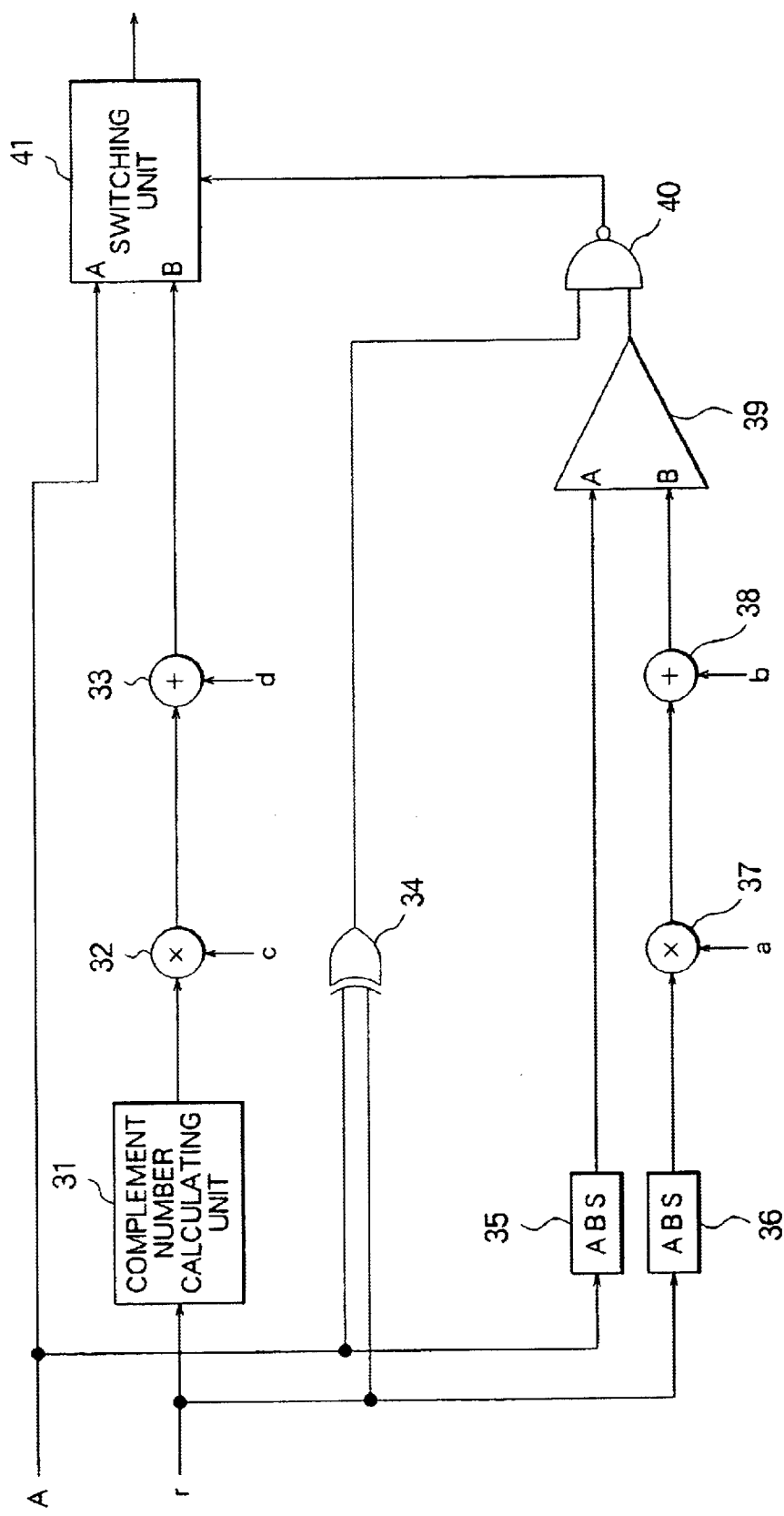
FIG. 5 is a block diagram of a compensation value calculating unit in the compensation value calculating apparatus shown in FIG. 3.

FIG. 5 is a block diagram of the configuration of the compensation value calculation unit $21_{-i}$.

The compensation value calculation unit $21_{-i}$ comprises a complement calculating unit 31, a first multiplier 32, a first adder 33, an exclusive logical sum (XOR) element 34, a first absolute value calculating unit 35, a second absolute value calculating unit 36, a second multiplier 37, a second adder 38, a comparator 39, a NAND element 40, and a switching unit 41.

The difference A with a predetermined adjacent pixel and a difference r with an adjacent pixel in the direction opposite to the pixel (top and bottom and left and right) are input to the compensation value calculation unit $21_{-i}$.

The complement calculating unit 31 calculates the complement of 2 for the input difference r and outputs the result to the first multiplier 32.

The first multiplier 32 multiplies a predetermined gain c with the value input from the complement calculating unit 31 and outputs the results to the first adder 33.

The first adder 33 adds a predetermined gain d to the value input from the first multiplier 32 and outputs the result to the terminal b of the switching unit 41.

The exclusive logical sum (XOR) element 34 compares the signs of the input differences A and r and outputs "1" to the NAND element 40 when the signs are different and "0" when the signs are the same.

The first absolute value calculating unit 35 calculates an absolute value of the input difference A and outputs it to the comparator 39.

The second absolute value calculating unit 36 calculates an absolute value for the input difference r and outputs it to the second multiplier 37.

The multiplier 37 multiplies a predetermined gain a with the value input from the second absolute value calculating unit 36 and outputs it to the second adder 38.

The second adder 38 adds a predetermined value b to the value input from the second multiplier 37 and outputs it to the comparator 39.

The comparator 39 compares the absolute value of the difference A input from the first absolute value calculating unit 35 with the value calculated by amplifying the difference r input from the adder 38 with gain a and adding a constant b. It outputs "1" to the NAND element 40 when the former is less than the latter and outputs "0" in other cases.

The NAND element 40 outputs a switching signal to the switching unit 41 in response to the output from the XOR element 34 and the comparator 39. The NAND element 40 outputs "1" when the output from the XOR element 34 is "0", which is the case when the signs of the input differences A and r are different and the case when the absolute value of the difference A is larger than a value calculated by amplifying the difference r with gain a and adding the constant b.

The switching unit 41 selects the input difference A as it is or the complement of 2 of the input difference r amplified by the gain c and added with the constant d based on the switching signal from the NAND element 40 and outputs the selected value as a standard compensation value from the compensation value calculating unit $21_{-i}$. Note that the switching unit 41 selects the former when "1" is input from the NAND element 40, while the latter when "0" is input, and outputs the selected value.

Next the multipliers $22_{-1}$ to $22_{-4}$ amplify the compensation values calculated in the first to fourth compensation value calculating units $21_{-1}$ to $21_{-4}$ respectively with the predetermined gains $G_{-1}$ to $G_{-4}$.

The adder $23_{-1}$ adds an amplified compensation value based on the differences with the pixels at the right and left found in the multipliers $22_{-1}$ and $22_{-2}$.

The adder $23_{-2}$ adds an amplified compensation value based on the differences with the top and bottom pixels found in the multipliers $22_{-3}$ and $22_{-4}$.

The adder 24 further adds the compensation values for the right and left and top and bottom pixels found in the adders $23_{-1}$ and $23_{-2}$.

The multiplier 25 further amplifies the compensation value found in the adder 24 with a predetermined gain $G_5$ to find the final compensation value.

Next, the operation of the compensation value apparatus 20 will be explained.

First, the compensation value calculating apparatus 20 receives as input the differences C–L, C–R, C–T, and C–B between a certain pixel C and its left, right, top, and bottom pixels L, R, T, and B.

Then, the first to fourth compensation value calculating units $21_{-1}$ to $21_{-4}$ receive as input a predetermined difference A and a difference r in a direction opposing it (top and bottom and left and right), respectively.

Each compensation value calculating unit $21_{-i}$ compares the signs of the differences A and r at the XOR element 34 and outputs the input predetermined difference A as it is as a standard compensation value when they are the same.

When the signs are different, it decides that the image data is of an edge portion. Then, comparator 39 compares the absolute value of the difference A calculated in the first absolute value calculating unit 35 and the absolute value of the difference r calculated in the second absolute value calculating unit 36 multiplied by a constant a in the multiplier 37 and added with a constant b in the second adder 38.

When the result of comparison shows that the absolute value of the difference A is less than the absolute value of the difference r multiplied by the constant a and added with the constant b, the input predetermined difference A is output as it is as a standard compensation value.

When the result of comparison shows that the absolute value of the difference A is larger than the absolute value of the difference r multiplied by the constant a and added with the constant b, the switching unit 40 selects the complement of 2 of the difference r calculated in the complement calculating unit 31 multiplied with the constant c at the first multiplier 32 and added with a constant d at the first adder 33, then outputs it as the standard compensation value.

The standard compensation values calculated in the first to fourth compensation value calculating units $21_{-1}$ to $21_{-4}$ in this way are then amplified with the predetermined gains $G_1$ to $G_4$ in the multipliers $22_{-1}$ to $22_{-4}$ to find the compensation values corresponding to each of the surrounding pixels.

The obtained compensation values are added, i.e., the compensation value for the left and right pixels at the adder $23_{-1}$ and the compensation values for the top and bottom pixels at the adder $23_{-2}$, respectively. Then, the sums are added at the adder 24, by which the four compensation values corresponding to the four adjacent pixels are added and a single compensation value is generated.

The obtained compensation value is further amplified with a predetermined gain $G_5$ at the multiplier 25 to find the final compensation value.

The resultant compensation value is added with the original image data outside of the compensation value calculating apparatus 20 to obtain compensated pixel data.

In the compensation value calculating apparatus 20 of the second embodiment as well, suitable contour compensation can be carried out based on the feature of the present invention that the relationship of value with the adjacent pixels is not changed before and after compensation. Namely, it prevents overshoot and undershoot at edge portions of an image where the brightness changes in steps and thereby enables excellent compensation. Also, it is possible to perform processing for adding a high frequency component in the same way as in the past to burst-like signals where white and black continuously repeat.

Further, the compensation value calculating apparatus 20 is also capable of suitably carrying out image enhancing processing if performing processing on all of the pixel data, therefore there is no need for edge detection in advance. As a result, the apparatus can be simplified.

Also, the compensation value calculating apparatus 20 of the second embodiment does not require differentiation circuits etc. so the configuration of the apparatus can be further simplified.

Furthermore, the digital still camera 50 including the above compensation value calculating apparatus 20 of the second embodiment can take high quality pictures.

Note that the present invention is not limited to the above embodiments and can be modified in various ways.

For example, the image enhancing processing carried out by the first contour compensation signal generation unit 11 and the adder 13 of the first embodiment can be performed by a different method.

For example, it is also possible to perform so-called density conversion processing where the contrast is enhanced based on the frequency of generation (number of pixels) of each pixel value of an image. Also, it is possible to perform processing using a high-pass filter for enhancing the high frequency component. Also, it is possible to perform edge detection processing to enhance the edges.

Further, each compensation value calculating unit $21_{-i}$ in the compensation value calculating apparatus 20 of the second embodiment outputs a complement of 2 of a difference r of a reference pixel, namely, the difference with the sign inverted, as a standard compensation value when limiting the compensation. This is because by adding the compensation value output from the compensation value calculating unit $21_{-i}$ in which the difference with a reference pixel is a main difference for calculating the compensation value at a later adder, it is possible to cancel out the compensation values and obtain a result close to that when not substantially performing compensation, so as to try to maintain the relationship of pixel values.

The method for obtaining the compensation value used for limited compensation is however not limited.

Any compensation value obtained by any method can be used as a compensation value so far as it can be expected with a considerable probability that the relationship of finally compensated pixel values can be kept in the state before compensation.

Also, the processing carried out by the first and second multipliers 32, 37 and the first and second adders 33, 38 in the compensation value calculation unit $21_{-i}$ of the second embodiment aims to eliminate the effects due to coring processing performed in the compensation value calculating apparatus 20 and to evaluate the compensation value and results of compensation. Therefore, it does not have any direct relationship with the gist of the present invention, so does not cause any trouble even if omitted from the configuration.

Further, the present embodiments were explained using the case of processing signals obtained by a CCD or other solid state camera, however, the invention may be applied to any apparatus as far as it performs contour compensation processing. For example, it may applied to a video editing apparatus for processing video signals, a computer for processing still images, etc.

As explained above, according to the image processing apparatus of the present invention, it is possible to prevent excessive compensation and carry out suitable contour compensation without making the apparatus large in size.

Also, according to the image processing method of the present invention, it is possible to prevent excessive compensation and carry out suitable contour compensation.

Also, according to the camera of the present invention, it is possible to prevent excessive compensation, carry out suitable contour compensation, and take high quality pictures without making the apparatus large in size.

What is claimed is:

1. An image processing apparatus, comprising:
   a first image processing means for carrying out image processing on input image data, said image processing being first image enhancing processing;
   a pixel detecting means for detecting a change in the relationship of magnitude of values between a pixel before and after said image processing based on the values of pixels of enhanced image data and said input image data;
   a second image processing means for carrying out second image enhancing processing with less effect than said first image enhancing processing on said input image data,
   wherein a selecting means outputs one of compensated pixel data of said first image processing means and compensated pixel data of said second image processing means,
   wherein said pixel detecting means performs primary differentiation on each pixel value of both said enhanced image data and said input image data and detects a change of the sign of the differentiated values to detect a change in the relationship of the two pixel values, and
   wherein said selecting means selects a pixel where there is no change in sign of said differentiated value as an enhanced pixel.

2. An image processing apparatus as set forth in claim 1, wherein said image enhancing processing is processing to enhance the contour of an image.

3. An image processing apparatus, comprising:
   a first image processing means for carrying out image processing on input image data, said image processing being first image enhancing processing;
   a pixel detecting means for detecting a change in the relationship of magnitude of values between a pixel before and after said image processing based on the values of pixels of enhanced image data and said input image data;
   a second image processing means for carrying out second image enhancing processing with less effect than said first image enhancing processing on said input image data,
   wherein a selecting means outputs one of compensated pixel data of said first image processing means and compensated pixel data of said second image processing means,
   wherein said pixel detecting means carries out subtraction for each pixel value of both said enhanced image data and said input image data from each adjacent pixel of the pixel and detects a change of the sign of the value of the remainder to detect a change in the relationship of the pixel values, and
   wherein said selecting means selects a pixel where there is no change in sign of said remainder as an enhanced pixel.

4. An image processing method including the steps of:
   carrying out first image processing on input original image data to produce enhanced image data;
   comparing values of said enhanced image data and said input original image data for each pixel;
   detecting a change in the relationship of magnitude of said values;
   selecting a pixel where there is no change in the relationship of magnitude between said enhanced image data and said input original image data based on the results of said step of detecting;
   carrying out second image enhancing processing on said input original image data with less effect than said first image enhancing processing; and
   outputting, as image data of the result of said image enhancing processing, one of first compensated pixel data of said first image processing and second compensated pixel data of said second image processing,
   wherein said step of detecting a change performs primary differentiation on each pixel value of both said enhanced image data and said original input image data and detects a change of the sign of the differentiated values to detect a change in the relationship of said enhanced image data and said input original image data, and
   said selecting step selects a pixel where there is no change in sign of said differentiated value as an enhanced pixel.

5. An image processing method as set forth in claim 4, wherein said step of carrying out first image processing comprises:

detecting a compensation value for carrying out image enhancement processing on each pixel of said input original image data, and adding said detected compensation value to the value of the corresponding pixel of said input original image to produce said compensated pixel data for generatinge said enhanced image data.

6. An image processing method as set forth in claim 4, wherein said image enhancing processing is processing to enhance the contour of an image.

7. An image processing method including the steps of:

carrying out first image processing on input original image data to produce enhanced image data;

comparing values of said enhanced image data and said input original image data for each pixel;

detecting a change in the relationship of magnitude of said values;

selecting a pixel where there is no change in the relationship of magnitude between said enhanced image data and said input original image data based on the results of said step of detecting;

carrying out second image enhancing processing on said input original image data with less effect than said first image enhancing processing; and outputting, as image data of the result of said image enhancing processing, one of first compensated pixel data of said first image processing and second compensated pixel data of said second image processing, wherein said step of detecting a change in said pixel carries out subtraction for each pixel value of both said enhanced image data and said input original image data from each adjacent pixel of the pixel and detects a change of the sign of the value of the remainder to detect a change in the relationship of the pixel values, and said selecting step selects a pixel where there is no change in sign of said remainder as an enhanced pixel.

8. An image processing method as set forth in claim 7, wherein said image enhancing processing is processing to enhance the contour of an image.

9. A camera apparatus, comprising:

an image input means for taking a desired image and inputting the input image data;

an image processing means for carrying out image enhancing processing on said input image data comprising:

a first image processing means for carrying out said image enhancing processing on said input image data, a pixel detecting means for comparing pixel values of said enhanced image data and said input image data for each pixel and detecting a change of the relationship of magnitude of the pixel value between pixels, said pixel detecting means performing primary differentiation on each pixel value of both said enhanced image data and said input image data, a selecting means for selecting a pixel where there is no change in the relationship of magnitude as a processed pixel based on the result of said detection;

a coding means for coding said processed image data; and a recording means for recording said coded image data, wherein said selecting means of said image processing means outputs one of compensated pixel data from said first image processing means and compensated pixel data from another image processing means.

10. A camera apparatus as set forth in claim 9, wherein said image enhancing processing is processing to enhance the contour of the image.

11. A camera apparatus as set forth in claim 9, wherein said image input means is a device to take a still picture and said recording means records said image data in a memory card.

12. A camera apparatus as set forth in claim 9, wherein said image input means is a device to take a moving picture and said recording means records said image data on video tape.

13. A camera apparatus, comprising:

an image input means for taking a desired image and inputting the input image data;

an image processing means for carrying out image enhancing processing on said input image data comprising:

a first image processing means for carrying out said image enhancing processing on said input image data, a pixel detecting means for comparing pixel values of said enhanced image data and said input image data for each pixel and detecting a change of the relationship of magnitude of the pixel value between pixels, said pixel detecting means performing subtraction for each pixel value of both said enhanced image data and said input image data from each adjacent pixel of the pixel and detects a change of the sign of the value of the remainder to detect a change in the relationship of the pixel values;

a selecting means for selecting a pixel where there is no change in the relationship of magnitude as a processed pixel based on the result of said detection;

a coding means for coding said processed image data; and a recording means for recording said coded image data, wherein said image processing means further comprises a second image processing means for carrying out second image enhancing processing with less effect than said first image enhancing processing on said input image data, and wherein said selecting means outputs one of compensated data of said first image processing means and the compensated pixel data of said second image processing means.

14. A camera apparatus as set forth in claim 13, wherein said image enhancing processing is processing to enhance the contour of the image.

15. A camera apparatus as set forth in claim 13, wherein said image input means is a device to take a still picture and said recording means records said image data in a memory card.

16. A camera apparatus as set forth in claim 13, wherein said image input means is a device to take a moving picture and said recording means records said image data on video tape.

17. An image processing apparatus, comprising:

a first image processing means for carrying out image processing on input image data, said image processing being image enhancement processing;

a pixel detecting means for detecting a change in the relationship of magnitude of values between a pixel before and after said image processing based on the values of pixels of enhanced image data and the input image data;

wherein said first image processing means comprises:
a compensation value detecting means for detecting a compensation value for carrying out said image enhancement processing on each pixel of said input image data,
a pixel generating means for adding a first compensation value to the value of the corresponding pixel of said input image data to produce compensated pixel data for generating said enhanced image data, and
a selecting means for selecting said selected compensation value from one of said first compensated value detected by said compensation value detecting means and another compensated value detected by another compensation value detecting means,
wherein said pixel detecting means performs primary differentiation on each pixel value of both said enhanced image data and said input image data and detects a change of the sign of the differentiated values to detect a change in the relationship of the two pixel values, and
said selecting means selects a pixel where there is no change in sign of said differentiated value as an enhanced pixel.

18. An image processing apparatus as set forth in claim 17, wherein said selecting means outputs said compensation value of said selected pixel.

19. An image processing apparatus as set forth in claim 17, wherein said image enhancing processing is processing to enhance the contour of an image.

20. An image processing apparatus, comprising:
a first image processing means for carrying out image processing on input image data, said image processing being image enhancement processing;
a pixel detecting means for detecting a change in the relationship of magnitude of values between a pixel before and after said image processing based on the values of pixels of enhanced image data and the input image data;
wherein said first image processing means comprises:
a compensation value detecting means for detecting a compensation value for carrying out said image enhancement processing on each pixel of said input image data,
a pixel generating means for adding a first compensation value to the value of the corresponding pixel of said input image data to produce compensated pixel data for generating said enhanced image data, and
a selecting means for selecting said selected compensation value from one of said first compensated value detected by said compensation value detecting means and another compensated value detected by another compensation value detecting means,
wherein said pixel detecting means carries out subtraction for each pixel value of both said enhanced image data and said input image data from each adjacent pixel of the pixel and detects a change of the sign of the value of the remainder to detect a change in the relationship of the pixel values, and
said selecting means selects a pixel where there is no change in sign of said remainder as an enhanced pixel.

21. An image processing method including the steps of:
carrying out image processing on input original image data to produce enhanced image data;
comparing values of said enhanced image data and said input original image data for each pixel;
detecting a change in the relationship of magnitude of said values;
selecting a pixel where there is no change in the relationship of magnitude between said enhanced image data and said input original image data based on the results of said step of detecting; and
outputting compensated pixel data for the selected pixel as image data of the result of image enhancing processing,
wherein said step of detecting a change performs primary differentiation on each pixel value of both said enhanced image data and said input original image data and detects a change of the sign of the differentiated values to detect a change in the relationship of said enhanced image data and said input original image data and,
wherein said selecting step selects a pixel where there is no change in sign of said differentiated value as an enhanced pixel.

22. An image processing method as set forth in claim 21, wherein said step of carrying out image processing comprises:
detecting a compensation value for carrying out said image enhancement processing on each pixel of said input original image data, and
adding said detected compensation value to the value of the corresponding pixel of said input original image to generate compensated pixel data for producing said enhanced image data.

23. An image processing method as set forth in claim 21, wherein said image processing is processing to enhance the contour of an image.

24. An image processing method including the steps of:
carrying out image processing on input original image data to produce enhanced image data;
comparing values of said enhanced image data and said input original image data for each pixel;
detecting a change in the relationship of magnitude of said values;
selecting a pixel where there is no change in the relationship of magnitude between said enhanced image data and said input original image data based on the results of said step of detecting; and
outputting compensated pixel data for the selected pixel as image data of the result of image enhancing processing,
wherein said step of detecting a change carries out subtraction for each pixel value of both said enhanced image data and said input original image data from each adjacent pixel of the pixel and detects a change of the sign of the value of the remainder to detect a change in the relationship of the pixel values, and
wherein said selecting step selects a pixel where there is no change in sign of said remainder as an enhanced pixel.

* * * * *